United States Patent
Ryu et al.

(10) Patent No.: US 11,737,029 B2
(45) Date of Patent: Aug. 22, 2023

(54) DOWNLINK PATHLOSS DETERMINATION FOR TRANSMIT POWER CONTROL FOR SIDELINK COMMUNICATIONS

(71) Applicant: QUALCOMM Incorporated, San Diego, CA (US)

(72) Inventors: Jung Ho Ryu, Fort Lee, NJ (US); Kapil Gulati, Hillsborough, NJ (US); Tianyang Bai, Sommerville, NJ (US); Junyi Li, Chester, NJ (US); Sony Akkarakaran, Poway, CA (US); Tao Luo, San Diego, CA (US); Vasanthan Raghavan, West Windsor Township, NJ (US)

(73) Assignee: QUALCOMM Incorporated, San Diego, CA (US)

(*) Notice: Subject to any disclaimer, the term of this patent is extended or adjusted under 35 U.S.C. 154(b) by 1 day.

(21) Appl. No.: 16/986,130

(22) Filed: Aug. 5, 2020

(65) Prior Publication Data
US 2021/0045062 A1 Feb. 11, 2021

Related U.S. Application Data

(60) Provisional application No. 62/887,261, filed on Aug. 15, 2019, provisional application No. 62/883,439, filed on Aug. 6, 2019.

(51) Int. Cl.
*H04W 52/10* (2009.01)
*H04W 56/00* (2009.01)
(Continued)

(52) U.S. Cl.
CPC .......... *H04W 52/10* (2013.01); *H04B 17/318* (2015.01); *H04L 5/0051* (2013.01);
(Continued)

(58) Field of Classification Search
CPC ........ H04L 5/00; H04W 24/10; H04W 52/10; H04W 52/241; H04W 52/242;
(Continued)

(56) References Cited

U.S. PATENT DOCUMENTS

2018/0049060 A1 2/2018 Fujishiro et al.
2019/0013902 A1 1/2019 Seo
(Continued)

FOREIGN PATENT DOCUMENTS

EP 2026491 A1 2/2009
EP 2950595 A1 12/2015
(Continued)

OTHER PUBLICATIONS

Convida Wireless: "Discussion on Sidelink Procedures", 3GPP Draft, 3GPP TSG-RAN WG1 Meeting #97, R1-1907465 on Sidelink Procedures, 3rd Generation Partnership Project (3GPP), Mobile Competence Centre, 650, Route Des Lucioles, F-06921 Sophia-Antipolis Cedex, France, vol. RAN WG1. No. Reno, USA, May 13, 2019-May 17, 2019 May 13, 2019 (May 13, 2019), XP051728896, 3 Pages, Retrieved from the Internet: URL:http://www.3gpp.org/ftp/Meetings%5F3GPP%5FSYNC/RAN1/Docs/R1%2D1907465%2Ezip [retrieved on May 13, 2019] paragraph 2.2.
(Continued)

*Primary Examiner* — Harun Chowdhury
(74) *Attorney, Agent, or Firm* — Arent Fox, LLP

(57) ABSTRACT

In an aspect, the present disclosure includes a method, apparatus, and computer readable medium for wireless communications for receiving, by a user equipment (UE) from a base station, a plurality of synchronization reference signals; measuring, by the UE, a respective Reference Signal Received Power (RSRP) value of each of the plurality synchronization reference signals; determining, by the UE, a highest RSRP value from each of the respective RSRP
(Continued)

values; and calculating, by the UE, a downlink pathloss associated with a sidelink open loop power control based on the highest RSRP value.

21 Claims, 13 Drawing Sheets

(51) Int. Cl.
  H04W 24/10     (2009.01)
  H04W 52/24     (2009.01)
  H04L 25/02     (2006.01)
  H04L 5/00      (2006.01)
  H04B 17/318    (2015.01)
  H04W 92/18     (2009.01)

(52) U.S. Cl.
  CPC ......... *H04L 25/0226* (2013.01); *H04W 24/10* (2013.01); *H04W 52/241* (2013.01); *H04W 52/242* (2013.01); *H04W 56/001* (2013.01); *H04W 92/18* (2013.01)

(58) Field of Classification Search
  CPC . H04W 52/247; H04W 52/383; H04W 76/14; H04W 56/001
  USPC .......................................... 370/252, 277, 329
  See application file for complete search history.

(56) References Cited

U.S. PATENT DOCUMENTS

| | | | | |
|---|---|---|---|---|
| 2020/0067674 | A1* | 2/2020 | Guan | H04L 5/00 |
| 2020/0260386 | A1* | 8/2020 | Ryu | H04W 52/383 |
| 2021/0022091 | A1* | 1/2021 | Li | H04W 52/242 |
| 2022/0217649 | A1* | 7/2022 | Lee | H04W 52/242 |

FOREIGN PATENT DOCUMENTS

| | | | |
|---|---|---|---|
| EP | 3051727 | A1 | 8/2016 |
| EP | 3644645 | A1 | 4/2020 |
| WO | 2019017583 | A1 | 1/2019 |
| WO | WO-2020125424 | A1 * | 6/2020 .......... H04W 56/001 |

OTHER PUBLICATIONS

Huawei et al., "Sidelink Physical Layer Procedures for NR V2X", 3GPP Draft, 3GPP TSG RAN WG1 Meeting #97, R1-1906008, 3rd Generation Partnership Project (3GPP), Mobile Competence Centre, 650, Route Des Lucioles, F-06921 Sophia-Antipolis Cedex, France, vol. RAN WG1. No. Reno. USA, May 13, 2019-May 17, 2019 May 13, 2019 (May 13, 2019), XP051727465, 23 Pages, Retrieved from the Internet: URL:http://www.3gpp.org/ftp/Meetings%5F3GPP%5FSYNC/RAN1/Docs/R1%2D1906008%2Ezip [retrieved on May 13, 2019] paragraph 5.1 paragraph 5.2.
Partial International Search Report—PCT/US2020/045265—ISA/EPO—dated Nov. 17, 2020.
International Search Report and Written Opinion—PCT/US2020/045265—ISA/EPO—dated Jan. 28, 2021.
International Search Report and Written Opinion—PCT/US2020/043104—ISA/EPO—dated Nov. 5, 2020.

* cited by examiner

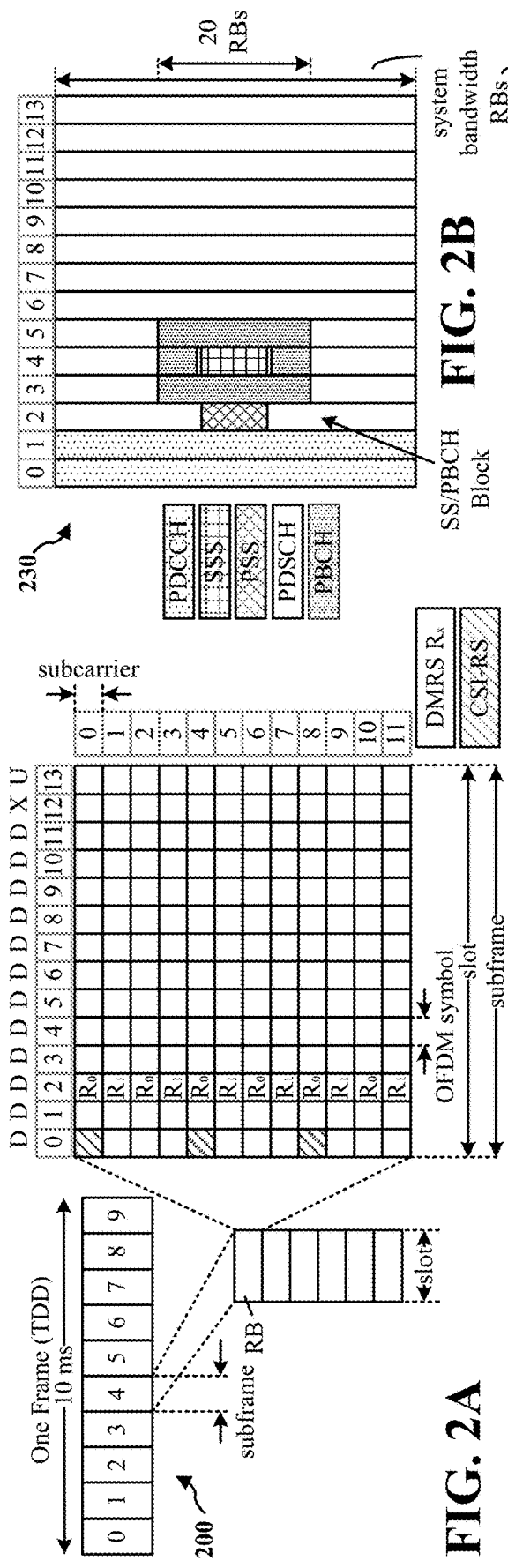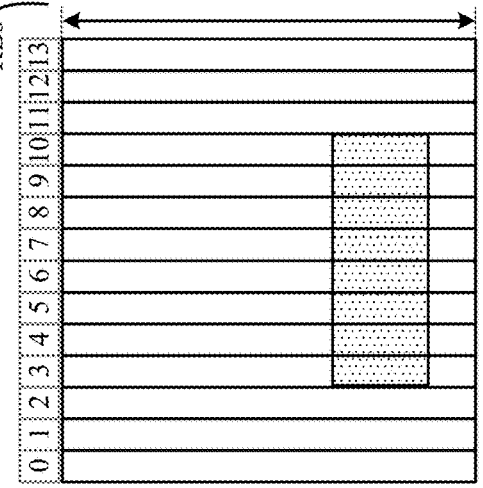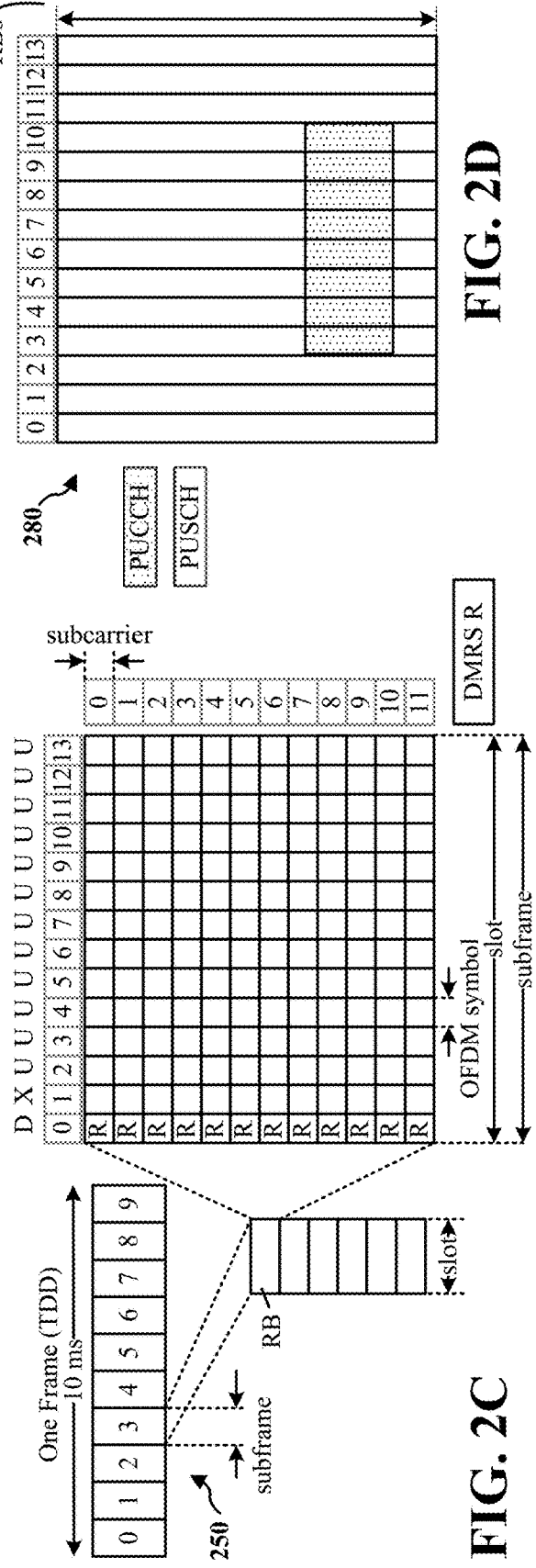
FIG. 2A  FIG. 2B  FIG. 2C  FIG. 2D

DOWNLINK PATHLOSS DETERMINATION FOR TRANSMIT POWER CONTROL FOR SIDELINK COMMUNICATIONS

CROSS-REFERENCE TO RELATED APPLICATION(S)

The present application claims benefit of U.S. Provisional Application No. 62/883,439 entitled "DOWNLINK PATHLOSS DETERMINATION FOR TRANSMIT POWER CONTROL FOR SIDELINK COMMUNICATIONS" filed Aug. 6, 2019, and U.S. Provisional Application No. 62/887,261 entitled "TECHNIQUES FOR SIDELINK TRANSMIT POWER CONTROL" filed Aug. 15, 2019, and are assigned to the assignee hereof and hereby expressly incorporated by reference herein.

BACKGROUND

Technical Field

The present disclosure relates generally to communication systems, and more particularly, to downlink pathloss determination for transmit power control for sidelink communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In such systems, the synchronization mechanism (e.g., timing and/or frequency synchronization) for a user equipment (UE) may be based on a connection to a global navigation satellite system (GNSS) or a cellular base station. Alternatively, in absence of a connection with a GNSS or base station, the synchronization for a UE may require sidelink synchronization with another UE that is already synchronized to a GNSS or base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, by a user equipment (UE) from a base station, a plurality of synchronization reference signals; measuring, by the UE, a respective Reference Signal Received Power (RSRP) value of each of the plurality synchronization reference signals; determining, by the UE, a highest RSRP value from each of the respective RSRP values; and calculating, by the UE, a downlink pathloss associated with a sidelink open loop power control based on the highest RSRP value. In this example, the UE may receive the plurality of synchronization reference signals on a receiving beam, and the receiving beam is used for communicating with a second UE on a sidelink.

In a further example, an apparatus for wireless communication is provided that includes a transceiver, a memory configured to store instructions, and one or more processors communicatively coupled with the transceiver and the memory. The aspect may include the one or more processors being configured execute instructions to receive, by a UE from a base station, a plurality of synchronization reference signals; measure, by the UE, a respective RSRP value of each of the plurality synchronization reference signals; determine, by the UE, a highest RSRP value from each of the respective RSRP values; calculate, by the UE, a downlink pathloss associated with a sidelink open loop power control based on the highest RSRP value; and receive the plurality of synchronization reference signals on a receiving beam, and the receiving beam is used for communicating with a second UE on a sidelink.

In another aspect, an apparatus for wireless communication is provided that includes means for receiving, by a UE from a base station, a plurality of synchronization reference signals; means for measuring, by the UE, a respective RSRP value of each of the plurality synchronization reference signals; means for determining, by the UE, a highest RSRP value from each of the respective RSRP values; means for calculating, by the UE, a downlink pathloss associated with a sidelink open loop power control based on the highest RSRP value; and means for receiving the plurality of synchronization reference signals on a receiving beam, and the receiving beam is used for communicating with a second UE on a sidelink.

In yet another aspect, a non-transitory computer-readable medium is provided including one or more processor executing code for receiving, by a UE from a base station, a plurality of synchronization reference signals; code for measuring, by the UE, a respective RSRP value of each of the plurality synchronization reference signals; code for determining, by the UE, a highest RSRP value from each of the respective RSRP values; code for calculating, by the UE, a downlink pathloss associated with a sidelink open loop power control based on the highest RSRP value; and code for receiving the plurality of synchronization reference signals on a receiving beam, and the receiving beam is used for communicating with a second UE on a sidelink.

In a further example, a method of wireless communication includes transmitting, by a UE to a base station, an indication to trigger the base station to determine a downlink pathloss for a sidelink transmit power open loop control; receiving, by the UE from the base station, a triggering signal to indicate a number of times for transmitting a plurality of Sounding Reference Signal (SRS) transmission signals in response to the indication; transmitting, by the UE to the base station, the plurality of SRS transmission signals on an uplink access link on a transmission beam used for communicating with a second UE on a sidelink; receiving, by the UE from the base station, a highest RSRP value from a plurality of RSRP values associated with each of the plurality of SRS transmission signals; and calculating, by the UE, the downlink pathloss based on a transmit power of the one of the plurality of SRS transmission signals associated with the highest RSRP value and the highest RSRP value.

In a further example, an apparatus for wireless communication is provided that includes a transceiver, a memory configured to store instructions, and one or more processors communicatively coupled with the transceiver and the memory. The aspect may include the one or more processors being configured execute instructions to transmit, by a UE to a base station, an indication to trigger the base station to determine a downlink pathloss for a sidelink transmit power open loop control; receive, by the UE from the base station, a triggering signal to indicate a number of times for transmitting a plurality of SRS transmission signals in response to the indication; transmit, by the UE to the base station, the plurality of SRS transmission signals on an uplink access link on a transmission beam used for communicating with a second UE on a sidelink; receive, by the UE from the base station, a highest RSRP value from a plurality of RSRP values associated with each of the plurality of SRS transmission signals; and calculate, by the UE, the downlink pathloss based on a transmit power of the one of the plurality of SRS transmission signals associated with the highest RSRP value and the highest RSRP value.

In another aspect, an apparatus for wireless communication is provided that includes means for transmitting, by a UE to a base station, an indication to trigger the base station to determine a downlink pathloss for a sidelink transmit power open loop control; means for receiving, by the UE from the base station, a triggering signal to indicate a number of times for transmitting a plurality of SRS transmission signals in response to the indication; means for transmitting, by the UE to the base station, the plurality of SRS transmission signals on an uplink access link on a transmission beam used for communicating with a second UE on a sidelink; means for receiving, by the UE from the base station, a highest RSRP value from a plurality of RSRP values associated with each of the plurality of SRS transmission signals; and means for calculating, by the UE, the downlink pathloss based on a transmit power of the one of the plurality of SRS transmission signals associated with the highest RSRP value and the highest RSRP value.

In yet another aspect, a non-transitory computer-readable medium is provided including one or more processor executing code for transmitting, by a UE to a base station, an indication to trigger the base station to determine a downlink pathloss for a sidelink transmit power open loop control; code for receiving, by the UE from the base station, a triggering signal to indicate a number of times for transmitting a plurality of SRS transmission signals in response to the indication; code for transmitting, by the UE to the base station, the plurality of SRS transmission signals on an uplink access link on a transmission beam used for communicating with a second UE on a sidelink; code for receiving, by the UE from the base station, a highest RSRP value from a plurality of RSRP values associated with each of the plurality of SRS transmission signals; and code for calculating, by the UE, the downlink pathloss based on a transmit power of the one of the plurality of SRS transmission signals associated with the highest RSRP value and the highest RSRP value.

In a further example, a method of wireless communication includes receiving, by a base station from a UE, an indication to trigger the base station to determine a highest RSRP for a sidelink transmit power open loop control for the UE; transmitting, by the base station from the UE, a triggering signal to indicate a number of times for transmitting a plurality of SRS transmission signals in response to the indication; receiving, by the base station from the UE, the plurality of SRS transmission signals on an uplink access link using a plurality of receiving beams; calculating, by the base station, a respective RSRP value for each of the plurality of SRS transmission signals received on the plurality of receiving beams; determining, by the base station, the highest RSRP value from each of the respective RSRP values; and transmitting, by the base station to the UE, the highest RSRP value.

In a further example, an apparatus for wireless communication is provided that includes a transceiver, a memory configured to store instructions, and one or more processors communicatively coupled with the transceiver and the memory. The aspect may include the one or more processors being configured execute instructions to receive, by a base station from a UE, an indication to trigger the base station to determine a highest RSRP for a sidelink transmit power open loop control for the UE; transmit, by the base station from the UE, a triggering signal to indicate a number of times for transmitting a plurality of SRS transmission signals in response to the indication; receive, by the base station from the UE, the plurality of SRS transmission signals on an uplink access link using a plurality of receiving beams; calculate, by the base station, a respective RSRP value for each of the plurality of SRS transmission signals received on the plurality of receiving beams; determine, by the base station, the highest RSRP value from each of the respective RSRP values; and transmit, by the base station to the UE, the highest RSRP value In another aspect, an apparatus for wireless communication is provided that includes means for receiving, by a base station from a UE, an indication to trigger the base station to determine a highest RSRP for a sidelink transmit power open loop control for the UE; means for transmitting, by the base station from the UE, a triggering signal to indicate a number of times for transmitting a plurality of SRS transmission signals in response to the indication; means for receiving, by the base station from the UE, the plurality of SRS transmission signals on an uplink access link using a plurality of receiving beams; means for calculating, by the base station, a respective RSRP value for each of the plurality of SRS transmission signals received on the plurality of receiving beams; means for determining, by the base station, the highest RSRP value from each of the respective RSRP values; and means for transmitting, by the base station to the UE, the highest RSRP value.

In yet another aspect, a non-transitory computer-readable medium is provided including one or more processor executing code for receiving, by a base station from a UE, an indication to trigger the base station to determine a highest RSRP for a sidelink transmit power open loop control for the UE; code for transmitting, by the base station from the UE, a triggering signal to indicate a number of times for transmitting a plurality of SRS transmission signals in response to the indication; code for receiving, by the base station from the UE, the plurality of SRS transmission signals on an uplink access link using a plurality of receiving beams; code for calculating, by the base station, a respective RSRP value for each of the plurality of SRS transmission signals received on the plurality of receiving beams; code for determining, by the base station, the highest RSRP value from each of the respective RSRP values; and code for transmitting, by the base station to the UE, the highest RSRP value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with one or more aspects of the present disclosure.

DETAILED DESCRIPTION

Figure 1:
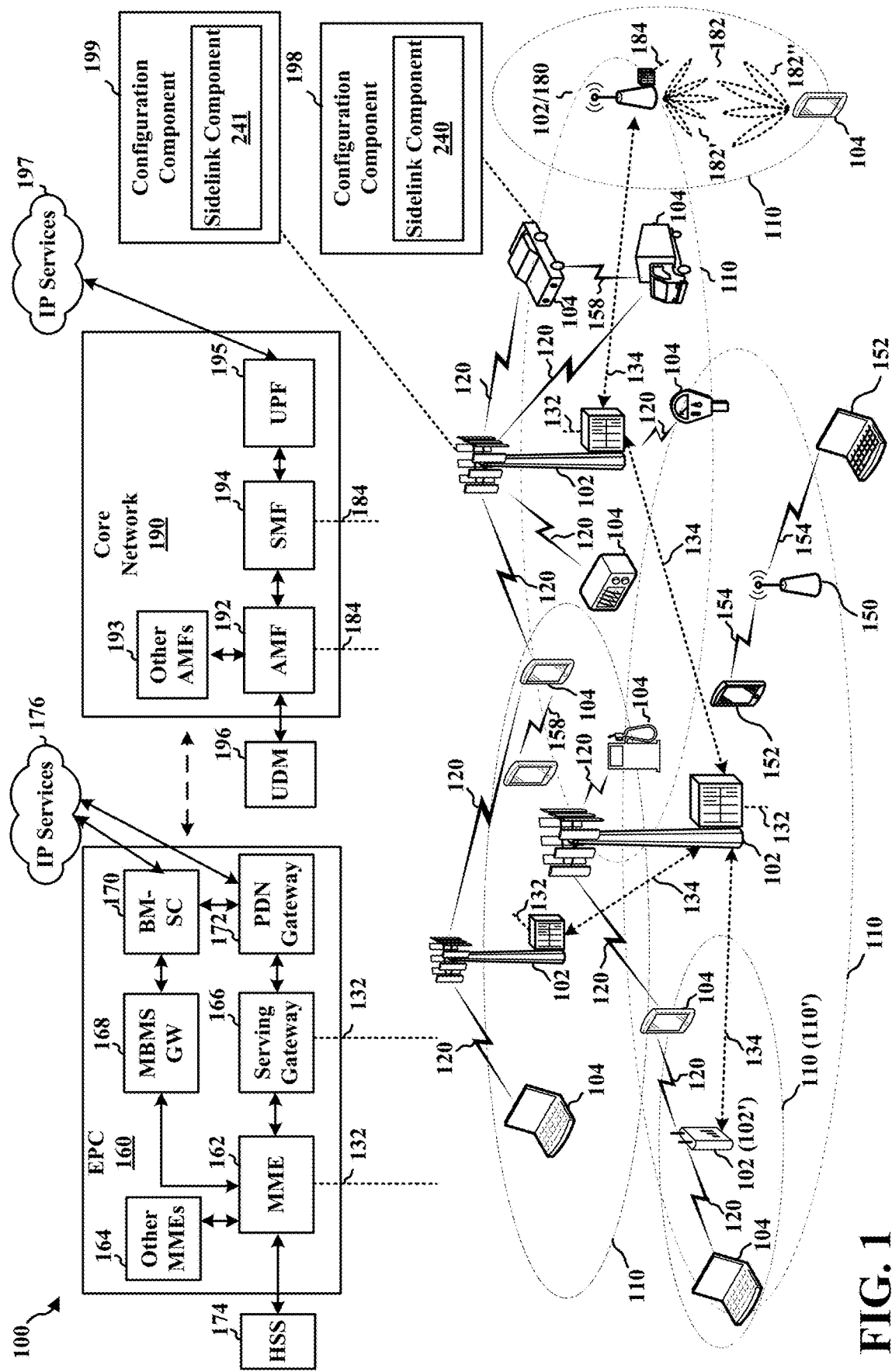
FIG. 1 is a diagram illustrating an example of a wireless communications system and an access network in accordance with one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate configuration component 198 to determine downlink pathloss for transmit power control for sidelink communications. Correspondingly, in certain aspects, the UE 104 may receive a plurality of synchronization reference signals. As noted, UE 104 may measure a respective Reference Signal Received Power (RSRP) value of each of the plurality synchronization reference signals, determine a highest RSRP value from each of the respective RSRP values, and calculate a downlink pathloss associated with a sidelink open loop power control based on the highest RSRP value.

In another aspect, UE 104 may utilize configuration component 198 and sidelink component 240 to transmit to a base station 102, an indication to trigger the base station to determine a downlink pathloss for a sidelink transmit power open loop control, receive, from the base station 102, a triggering signal to indicate a number of times for transmitting a plurality of Sounding Reference Signal (SRS) transmission signals in response to the indication, transmit, to the base station, the plurality of SRS transmission signals on an uplink access link on a transmission beam used for communicating with a second UE on a sidelink, receive, from the base station 102, a highest RSRP value from a plurality of RSRP values associated with each of the plurality of SRS transmission signals, and calculate the downlink pathloss based on a transmit power of the one of the plurality of SRS transmission signals associated with the highest RSRP value and the highest RSRP value.

In another aspect, base station 102 may utilize configuration component 199 and sidelink component 241 to receive, from a UE, an indication to trigger the base station to determine a highest RSRP for a sidelink transmit power open loop control for the UE, transmit, from the UE, a triggering signal to indicate a number of times for transmitting a plurality of SRS transmission signals in response to the indication, receive, from the UE, the plurality of SRS transmission signals on an uplink access link using a plurality of receiving beams; calculate a respective RSRP value for each of the plurality of SRS transmission signals received on the plurality of receiving beams, determine the highest RSRP value from each of the respective RSRP values, and transmit, to the UE, the highest RSRP value.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, and the UEs 104a/b, described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to V*15 kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
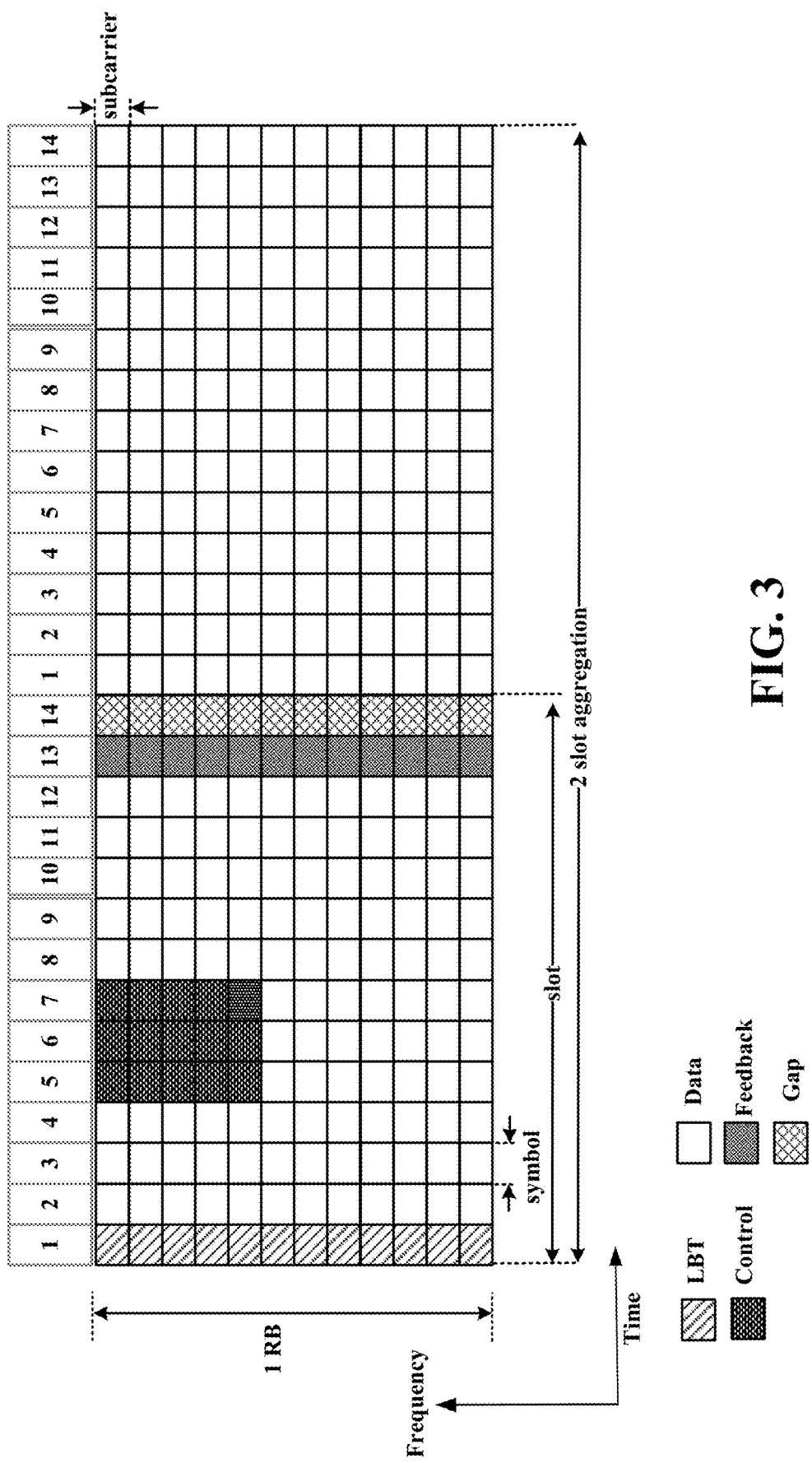
FIG. 3 is a diagram illustrating a frame structure and resources for sidelink communications in accordance with one or more aspects of the present disclosure.

FIG. 3 is a diagram 290 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
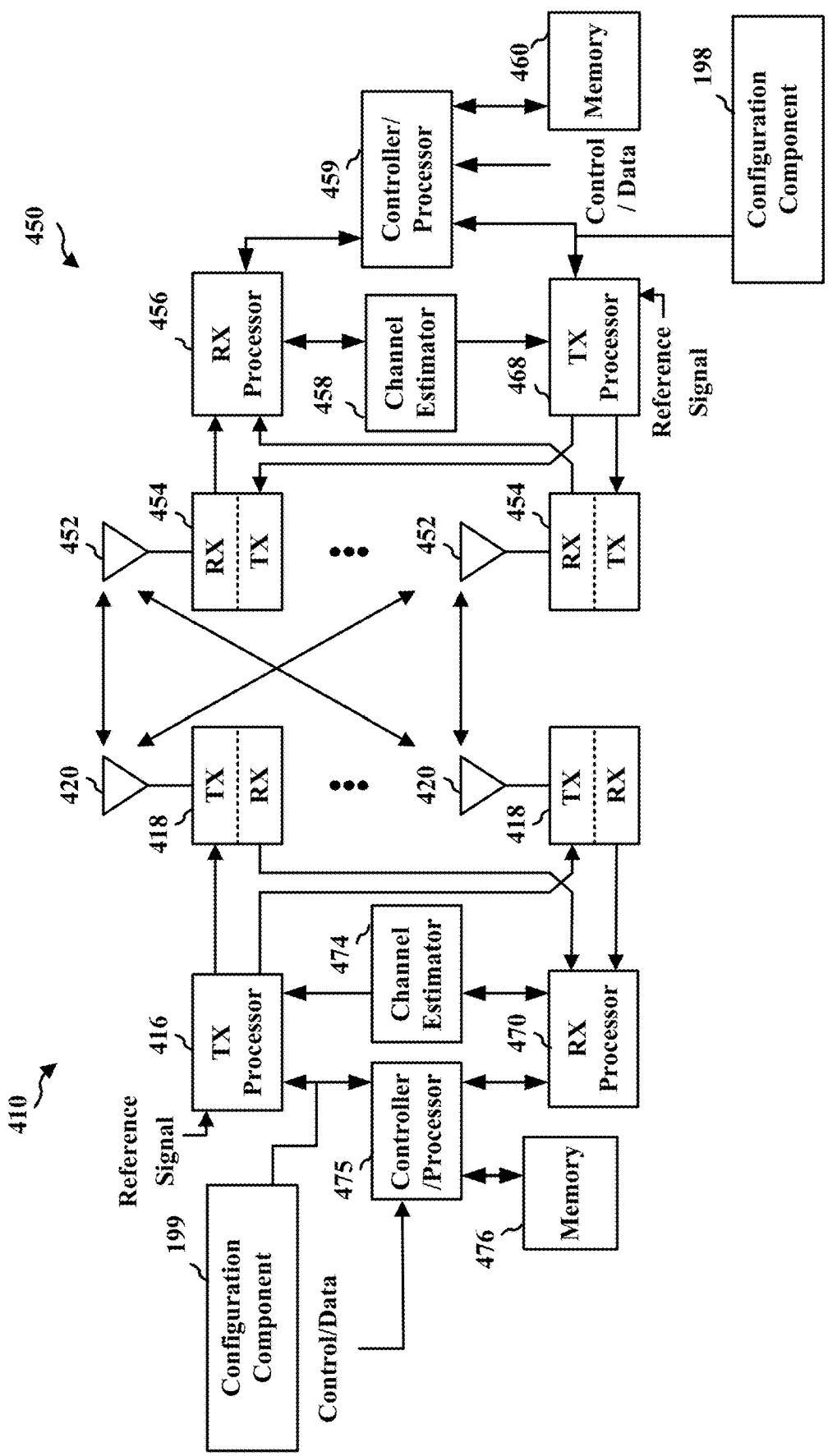
FIG. 4 is a diagram illustrating an example of a base station and user equipment (UE) in an access network in accordance with one or more aspects of the present disclosure.

FIG. 4 is a block diagram of a base station 410 in communication with a UE 450 in an access network, where the base station 410 may be an example implementation of base station 102 and where UE 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with 198 of FIG. 1.

At least one of the TX processor 416, the RX processor 470, and the controller/processor 475 may be configured to perform aspects in connection with 199 of FIG. 1.

Figure 5:
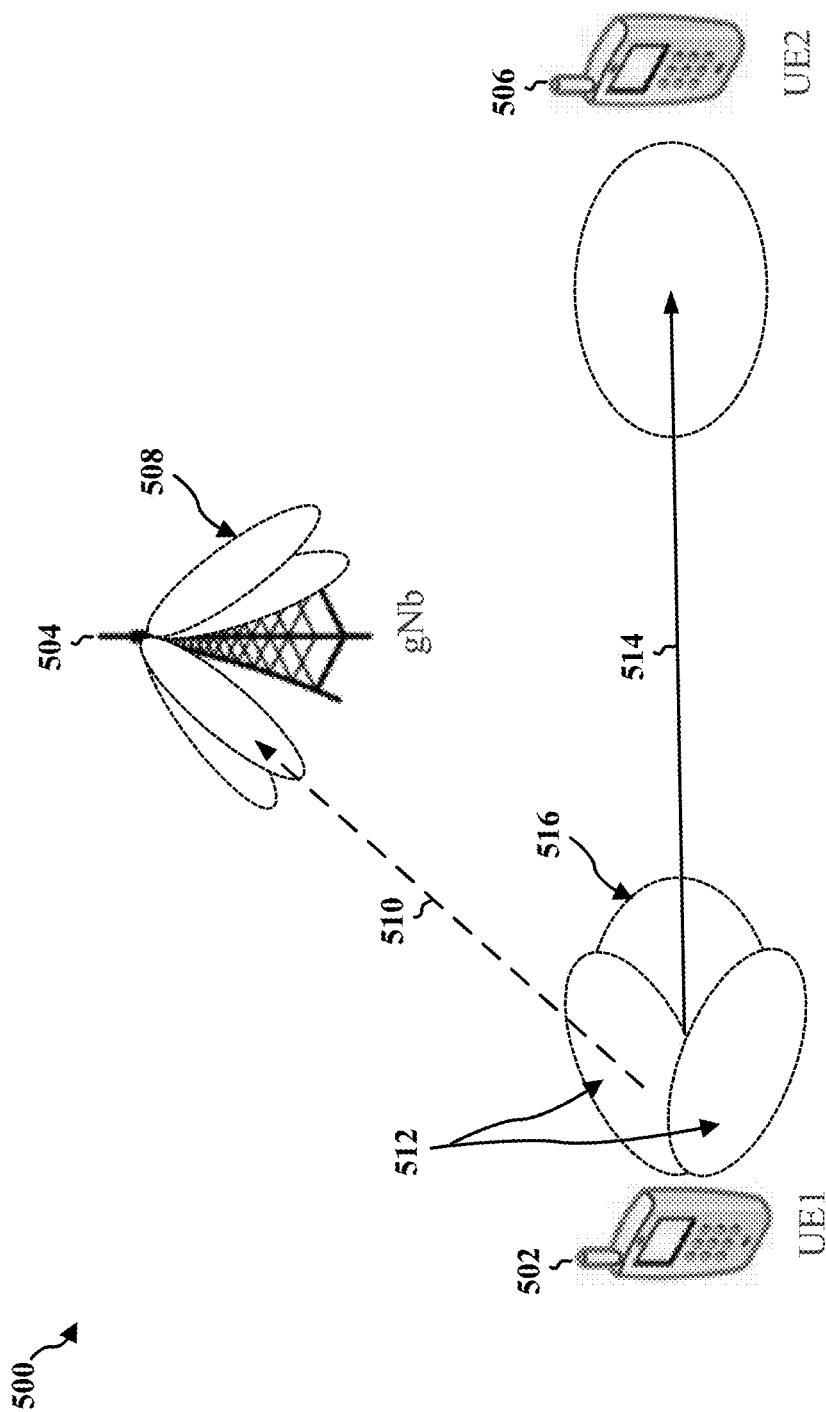
FIG. 5 is a diagram illustrating an example of sidelink communication between two UEs in the vicinity of a base station in accordance with one or more aspects of the present disclosure.

Referring to FIG. 5, the present aspects generally relate to sidelink communication scenario 500 between two UEs 502, 506 in the vicinity of a base station 504. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink communication scenario 500, when UE1 502 is transmitting to UE2 506 using a beam 512/516, UE1 502 may cause interference at base station 504 because of side lobe 512. The main lobe of the beam 512/516 is indicated by 512, and the side lobes of the beam are indicated by 516. The main lobe of a beam should be directed towards the intended receiver; the side lobes cannot be steered and are interference to other receivers. In an example, base station 504 may use SSB beams 508 to transmit a synchronization signals in multiple directions. UE1 502 may utilize main lobe 512 of one beam to communicate with UE2 506 on a sidelink. For example, main lobe 516 may be directed towards UE2 506 and be used for communicating on a sidelink. Sidelobes 512 may spill energy in other directions and potentially cause interference to base station 504. When UE1 502 transmits to UE2 506 on the sidelink, the UE1 502 needs to take into consideration both the pathloss between the UE1 502 and the UE2 506 as well as the pathloss between the UE1 502 and the base station 504. The pathloss between UE1 502 and UE2 506 impacts the received signal power of the intended transmission on the sidelink from UE1 to UE2 at UE2; the pathloss between UE1 502 and base station 504 impacts the interference the transmission from UE1 to UE2 at base station 504. As an example, UE1 502 may use an open loop power control to control the transmit power of the signal between UE1 502 and UE2 506 so that the transmit power is configured to compensate for the sidelink pathloss but is limited to limit the interference the transmission on the sidelink causes at base station 504. As an example, UE1 502 may use the following calculation: $\min(P_0+PL_{DL}, P_0+PL_{SL})$ where $P_0$ is the desired receive signal power at UE2 504 and $PL_{DL}$ is the pathloss between UE1 502 and base station 504 and $PL_{SL}$ is the pathloss between UE1 502 and UE2 506. $PL_{SL}$ can be calculated UE1 502 by measuring the received signal power of a reference signal with known transmit power transmitted by UE2 506. Accordingly, UE1 502 needs to calculate the downlink pathloss $PL_{DL}$ to use in the power control loop for determining the sidelink transmit power when communicating with UE2 506 on the sidelink.

Figure 6:
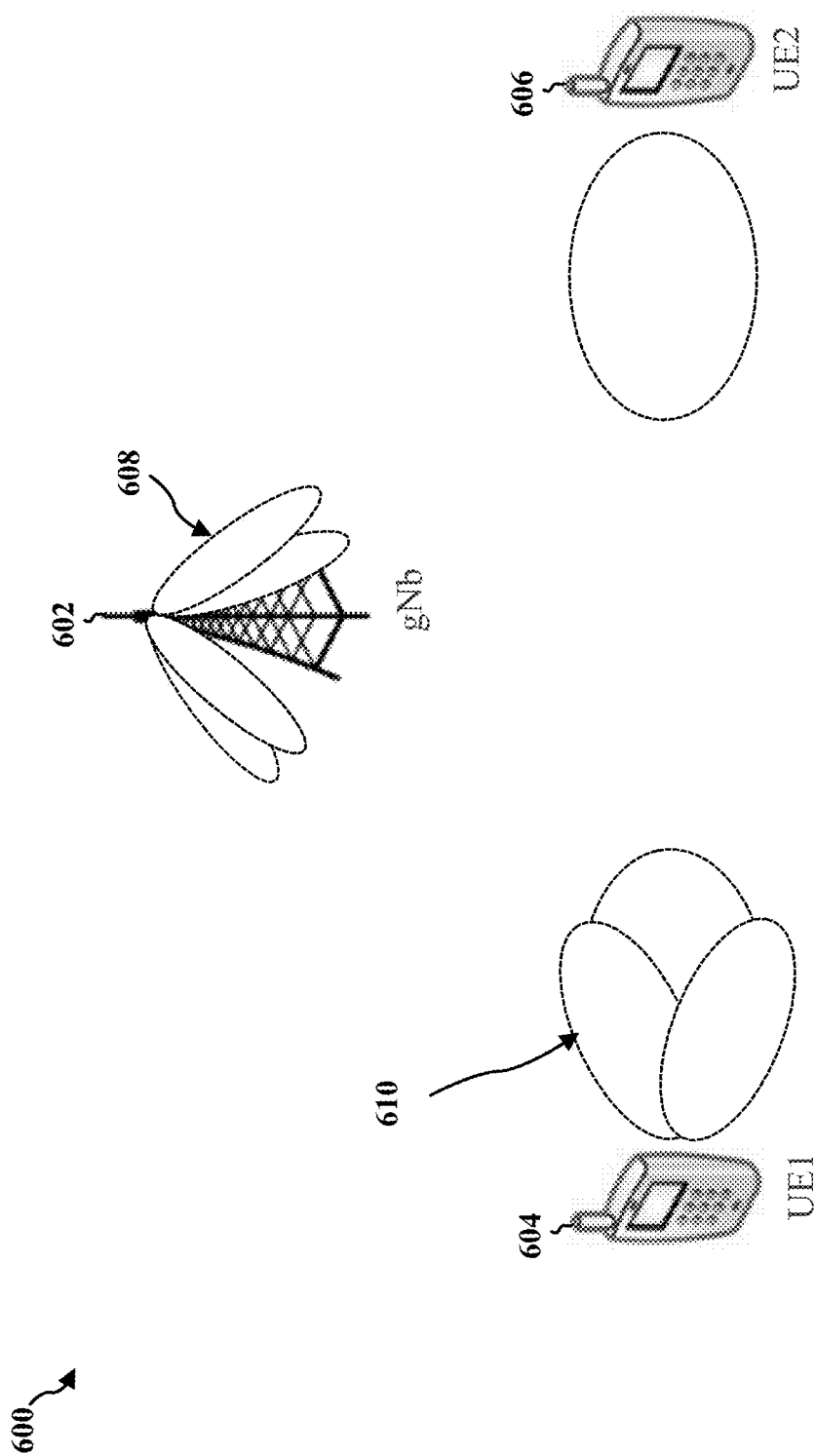
FIG. 6 is a diagram illustrating an example of a reciprocal procedure for determining transmit power for sidelink communications in accordance with one or more aspects of the present disclosure.

Referring to FIG. 6, the present aspects generally relate to sidelink communication scenario 600 illustrates a procedure for determining transmit power for sidelink communications. As mentioned above, sidelink communication generally includes any type of D2D communication. D2D communications may be used in applications such as, but not limited to, V2X or vehicle to any other device type of communications, sensor networks, public safety-related communication services with limited infrastructure availability, or any other such type of application.

In the sidelink communication scenario 600, base station 602 may transmit SSB on SSB beams 608. In an example, UE1 604 uses a sidelink transmission beam to receive SSB transmissions from base station 602. The sidelink transmission beam 610 is used for sidelink communications with UE2 606. UE1 604 may then receive and measure the receive signal power of the SSB transmissions from base station 602 on beams 608 while using the sidelink beam 610. UE1 604 already knows the transmit power of the SSB signal from the MIB, SIB, or RRC messages from the base station 602. Further, UE1 604 may then use the maximum SSB received signal power to compute a downlink pathloss $PL_{DL}$ to use in the open loop power control by calculating the downlink pathloss based on a difference between a transmit power value of the plurality of SSB transmission signals and the highest RSRP value.

Figure 7:
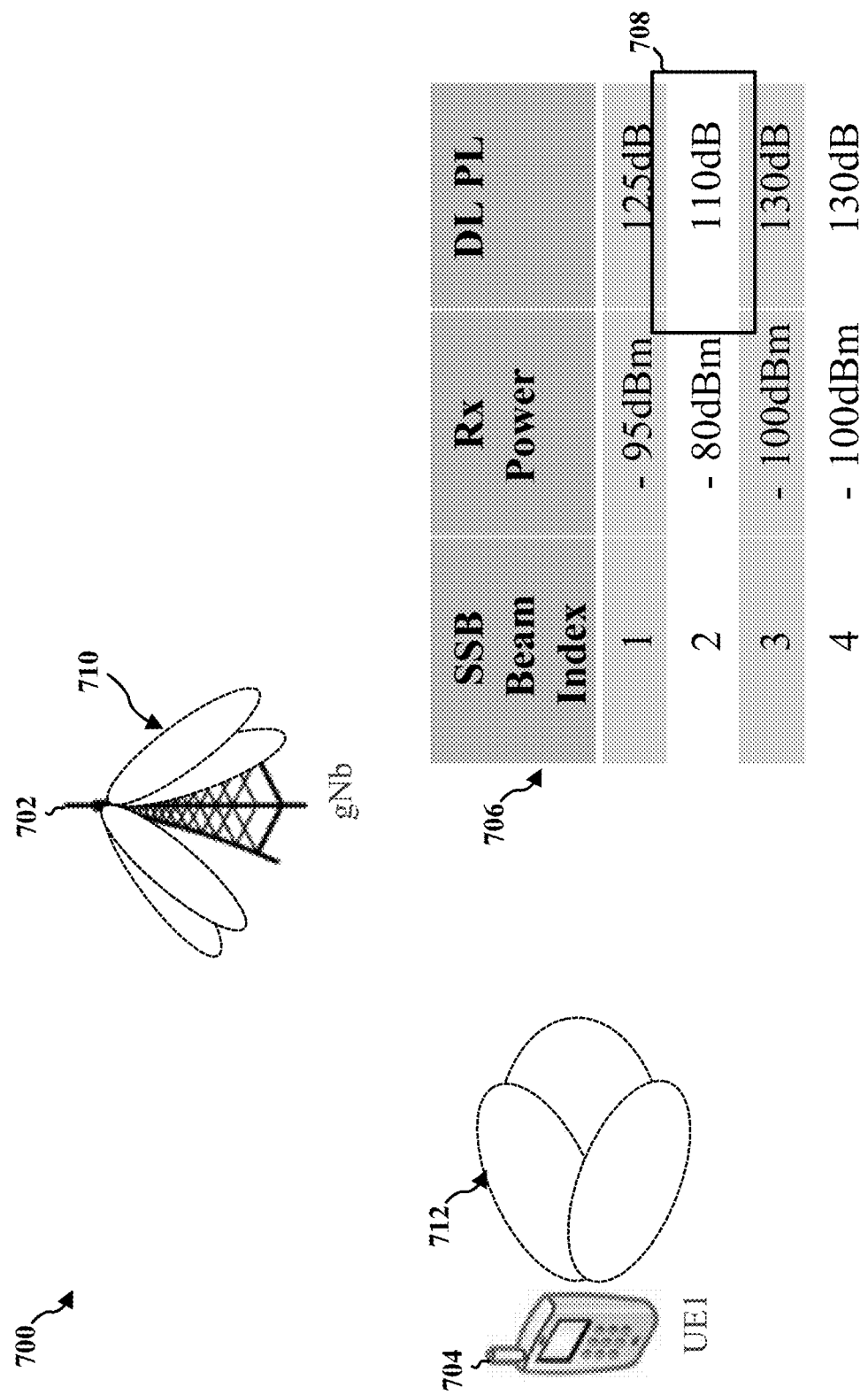
FIG. 7 is a diagram illustrating an example of a reciprocal procedure for determining transmit power for sidelink communications in accordance with one or more aspects of the present disclosure.

Referring to FIG. 7, the present aspects generally relate to sidelink communication scenario 700 illustrates a procedure for determining transmit power for sidelink communications. As mentioned above, sidelink communication generally includes any type of D2D communication. D2D communications may be used in applications such as, but not limited to, V2X or vehicle to any other device type of communications, sensor networks, public safety-related communication services with limited infrastructure availability, or any other such type of application.

In the sidelink communication scenario 700, base station 702 transmits SSBs at a preconfigured power known to UE1 on beams 710. In an example, base station 702 transmits the SSBs at 30 dBm transmit power. UE1 704 uses the sidelink transmission beam 712 to receive and measure the SSB receive powers. In the table 706, UE1 may determine that based on the known transmit power of the SSBs and the received power of the SSBs, the downlink pathloss $PL_{DL}$ to be used in the open loop power control for sidelink should be 110 dB. Thus, in this example, the UE1 704 may determine the maximum interference it may cause to the base station 702 if the sidelink transmission on beam 712 were to be used for sidelink communications.

Figure 8:
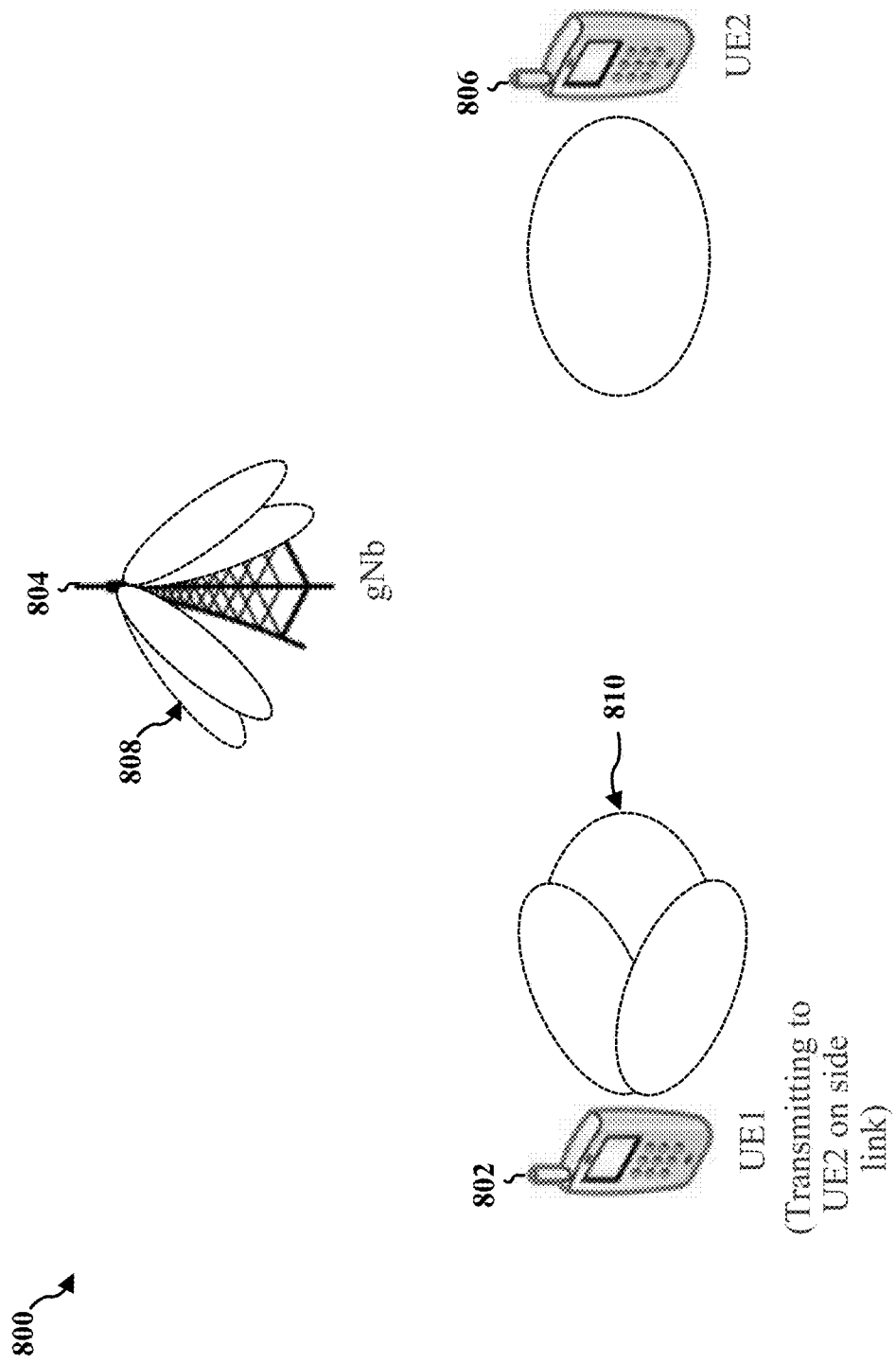
FIG. 8 is a diagram illustrating an example of a non-reciprocal procedure for determining transmit power for sidelink communications in accordance with one or more aspects of the present disclosure.

Referring to FIG. 8, the present aspects generally relate to sidelink communication scenario 800 illustrates a another procedure for determining the downlink pathloss $PL_{DL}$ for the open loop power control for sidelink communication. As mentioned above, sidelink communication generally includes any type of D2D communication. D2D communications may be used in applications such as, but not limited to, V2X or vehicle to any other device type of communications, sensor networks, public safety-related communication services with limited infrastructure availability, or any other such type of application.

In the sidelink communication scenario 800, UE1 802 may transmit an indication to trigger the base station 804 to determine a downlink pathloss for a sidelink transmit power open loop control. In response, base station 804 may transmit an indication to UE1 802 to transmit plurality of SRS on the transmission beam 810 that UE1 802 would use for communicating with UE2 806 on the sidelink. The base station 804 receives the plurality of SRS transmissions from UE1 on plurality of receive beams 808. The base station 804 measures the received signal power of the plurality of SRS transmissions and indicates to UE1 802 the highest received signal power of the plurality of SRS transmissions. Based on the indicate from base station 804 and the power at which UE1 802 transmitted the plurality of SRS, UE1 may determine the downlink pathloss $PL_{DL}$ the UE1 may use in the open loop power control for sidelink.

Figure 9:
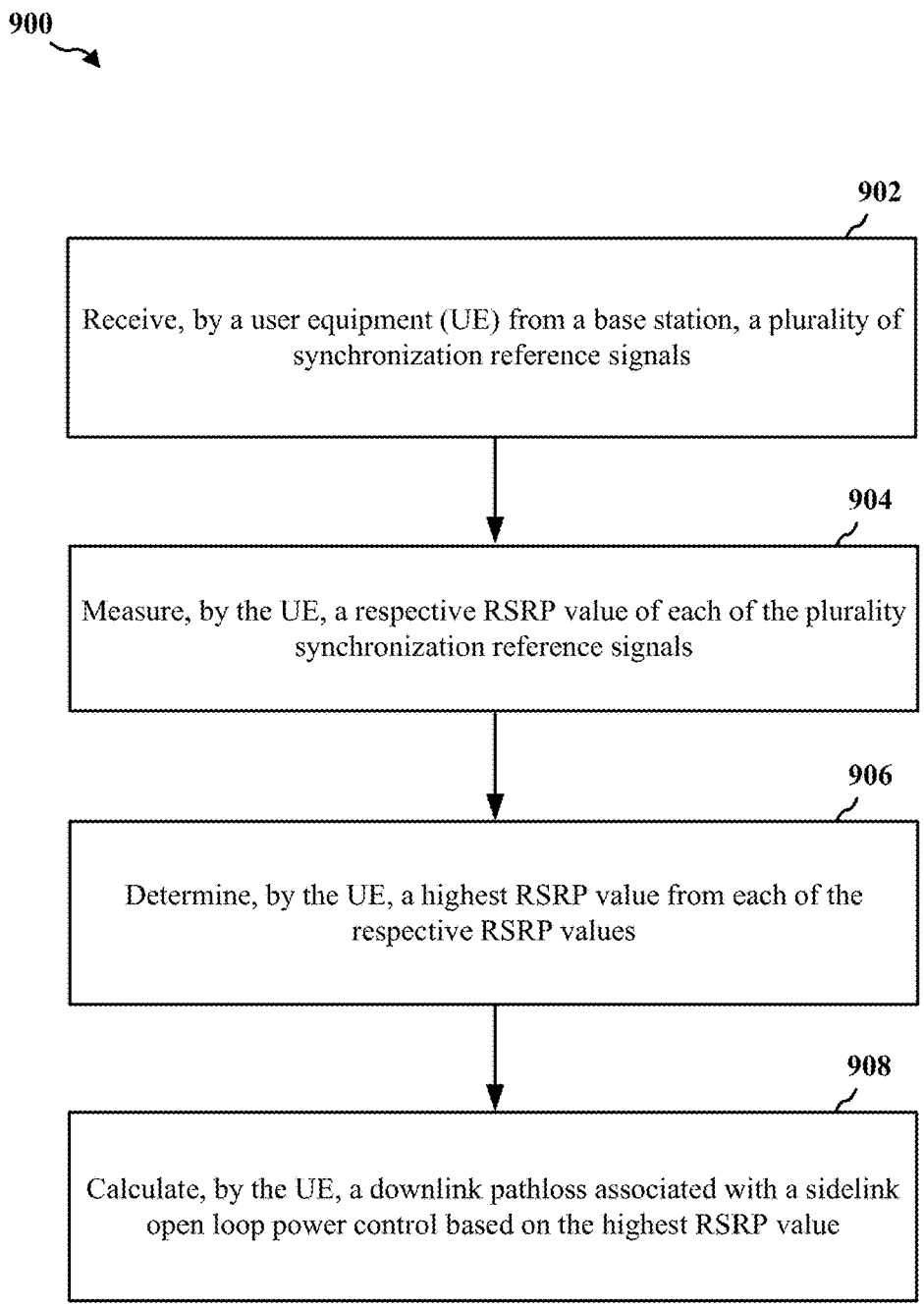
FIG. 9 is a flowchart of a method of wireless communication of a UE using a reciprocal procedure for calculating downlink pathloss in accordance with one or more aspects of the present disclosure.

Referring to FIG. 9, an example method 900 of wireless communication may be performed by the UE 104. In an example, a UE 104 can perform the functions described in method 900 using one or more of the components described in FIGS. 1, 4 and 12.

At 902, method 900 includes receiving, by a UE from a base station, a plurality of synchronization reference signals. In some aspects, the configuration component 198, such as in conjunction with processor(s) 459/1212, memory 460/1216, or transceiver 468/1202, may be configured to receive, from a base station, a plurality of synchronization reference signals. Thus, the UE 104, the processor(s) 459/1212, the configuration component 198 may define the means for receiving, from a base station, a plurality of synchronization reference signals.

At 904, method 900 includes measuring, by the UE, a respective RSRP value of each of the plurality synchronization reference signals. In some aspects, the configuration component 198, such as in conjunction with processor(s) 459/1212, memory 460/1216, or transceiver 468/1202, may be configured to measure a respective RSRP value of each of the plurality synchronization reference signals. Thus, the UE 104, the processor(s) 459/1212, the configuration component 198 may define the means for measuring, by the UE, a respective RSRP value of each of the plurality synchronization reference signals.

At 906, method 900 includes determining, by the UE, a highest RSRP value from each of the respective RSRP values. In some aspects, the configuration component 198, such as in conjunction with processor(s) 459/1212, memory 460/1216, or transceiver 468/1202, may be configured to determine, by the UE, a highest RSRP value from each of the respective RSRP values. Thus, the UE 104, the processor(s) 459/1212, the configuration component 198 may define the means for determining, by the UE, a highest RSRP value from each of the respective RSRP values.

At 908, method 900 includes calculating, by the UE, a downlink pathloss associated with a sidelink open loop power control based on the highest RSRP value. In some aspects, the configuration component 198, such as in conjunction with processor(s) 459/1212, memory 460/1216, or transceiver 468/1202, may be configured to determine, by the UE, a highest RSRP value from each of the respective RSRP values. Thus, the UE 104, the processor(s) 459/1212, the configuration component 198 may define the means for determining, by the UE, a highest RSRP value from each of the respective RSRP values.

In some implementations of method 900, the plurality of synchronization reference signals correspond to a plurality of SSB transmission signals.

In some implementations of method 900, the configuration component 198, such as in conjunction with processor(s) 459/1212, memory 460/1216, or transceiver 468/1202, configured to calculate the downlink pathloss further comprises calculating the downlink pathloss based on a difference between a transmit power value of the plurality of SSB transmission signals and the highest RSRP value.

In some implementations of method 900, the configuration component 198, such as in conjunction with processor(s) 459/1212, memory 460/1216, or transceiver 468/1202, configured to receive the plurality of synchronization reference signals further comprises receiving the plurality of synchronization reference signals on a receiving beam.

In some implementations of method 900, the receiving beam is used for communicating with a second UE on a sidelink.

In some implementations of method 900, the configuration component 198, such as in conjunction with processor(s) 459/1212, memory 460/1216, or transceiver 468/1202, is configured to determine a transmit power of communications with a second UE on a sidelink based on the downlink pathloss.

In some implementations of method 900, the configuration component 198, such as in conjunction with processor(s) 459/1212, memory 460/1216, or transceiver 468/1202, configured to determine the transmit power of communication with the second UE on the sidelink further comprises calculating a sidelink transmit power based on a target receive power value and the downlink pathloss.

In some implementations of method 900, the target receive power value corresponds to an open loop power control for the sidelink transmit power.

Figure 10:
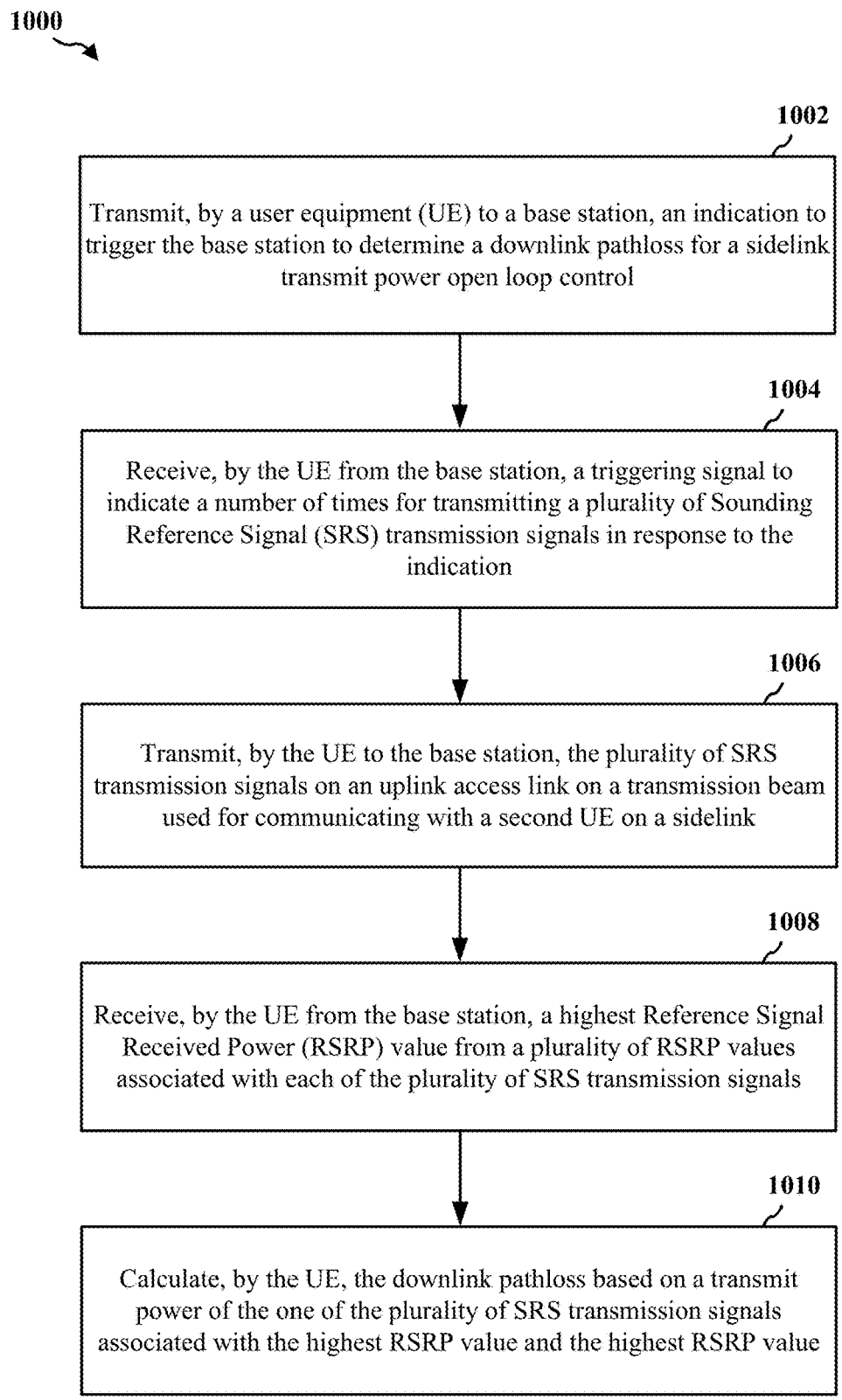
FIG. 10 is a flowchart of a method of wireless communication of a UE using a non-reciprocal procedure for calculating downlink pathloss in accordance with one or more aspects of the present disclosure.

Referring to FIG. 10, an example method 1000 of wireless communication may be performed by the UE 104. In an example, a UE 104 can perform the functions described in method 1000 using one or more of the components described in FIGS. 1, 4 and 12.

At 1002, method 1000 includes transmitting, by a UE to a base station, an indication to trigger the base station to determine a downlink pathloss for a sidelink transmit power open loop control. In some aspects, the configuration component 198, such as in conjunction with processor(s) 459/1212, memory 460/1216, or transceiver 468/1202, may be configured to transmit, to a base station, an indication to trigger the base station to determine a downlink pathloss for a sidelink transmit power open loop control. Thus, the UE 104, the processor(s) 459/1212, the configuration component 198 may define the means for transmitting, by a UE to a base station, an indication to trigger the base station to determine a downlink pathloss for a sidelink transmit power open loop control.

At 1004, method 1000 includes receiving, by the UE from the base station, a triggering signal to indicate a number of times for transmitting a plurality of SRS transmission signals in response to the indication. In some aspects, the configuration component 198, such as in conjunction with processor(s) 459/1212, memory 460/1216, or transceiver 468/1202, may be configured to receive, from the base station, a triggering signal to indicate a number of times for transmitting a plurality of SRS transmission signals in response to the indication. Thus, the UE 104, the processor(s) 459/1212, the configuration component 198 may define the means for receiving, by the UE from the base station, a triggering signal to indicate a number of times for transmitting a plurality of SRS transmission signals in response to the indication.

At 1006, method 1000 includes transmitting, by the UE to the base station, the plurality of SRS transmission signals on an uplink access link on a transmission beam used for communicating with a second UE on a sidelink. In some aspects, the configuration component 198, such as in conjunction with processor(s) 459/1212, memory 460/1216, or transceiver 468/1202, may be configured to transmit, to the base station, the plurality of SRS transmission signals on an uplink access link on a transmission beam used for communicating with a second UE on a sidelink. Thus, the UE 104, the processor(s) 459/1212, the configuration component 198 may define the means for transmitting, by the UE to the base station, the plurality of SRS transmission signals on an uplink access link on a transmission beam used for communicating with a second UE on a sidelink.

At 1008, method 1000 includes receiving, by the UE from the base station, a highest RSRP value from a plurality of RSRP values associated with each of the plurality of SRS transmission signals. In some aspects, the configuration component 198, such as in conjunction with processor(s) 459/1212, memory 460/1216, or transceiver 468/1202, may be configured to receive, from the base station, a highest RSRP value from a plurality of RSRP values associated with each of the plurality of SRS transmission signals. Thus, the UE 104, the processor(s) 459/1212, the configuration component 198 may define the means for receiving, by the UE from the base station, a highest RSRP value from a plurality of RSRP values associated with each of the plurality of SRS transmission signals.

At 1010, method 1000 includes calculating, by the UE, the downlink pathloss based on a transmit power of the one of the plurality of SRS transmission signals associated with the highest RSRP value and the highest RSRP value. In some aspects, the configuration component 198, such as in conjunction with processor(s) 459/1212, memory 460/1216, or transceiver 468/1202, may be configured to calculate the downlink pathloss based on a transmit power of the one of the plurality of SRS transmission signals associated with the highest RSRP value and the highest RSRP value. Thus, the UE 104, the processor(s) 459/1212, the configuration component 198 may define the means for calculating, by the UE, the downlink pathloss based on a transmit power of the one of the plurality of SRS transmission signals associated with the highest RSRP value and the highest RSRP value.

Figure 11:
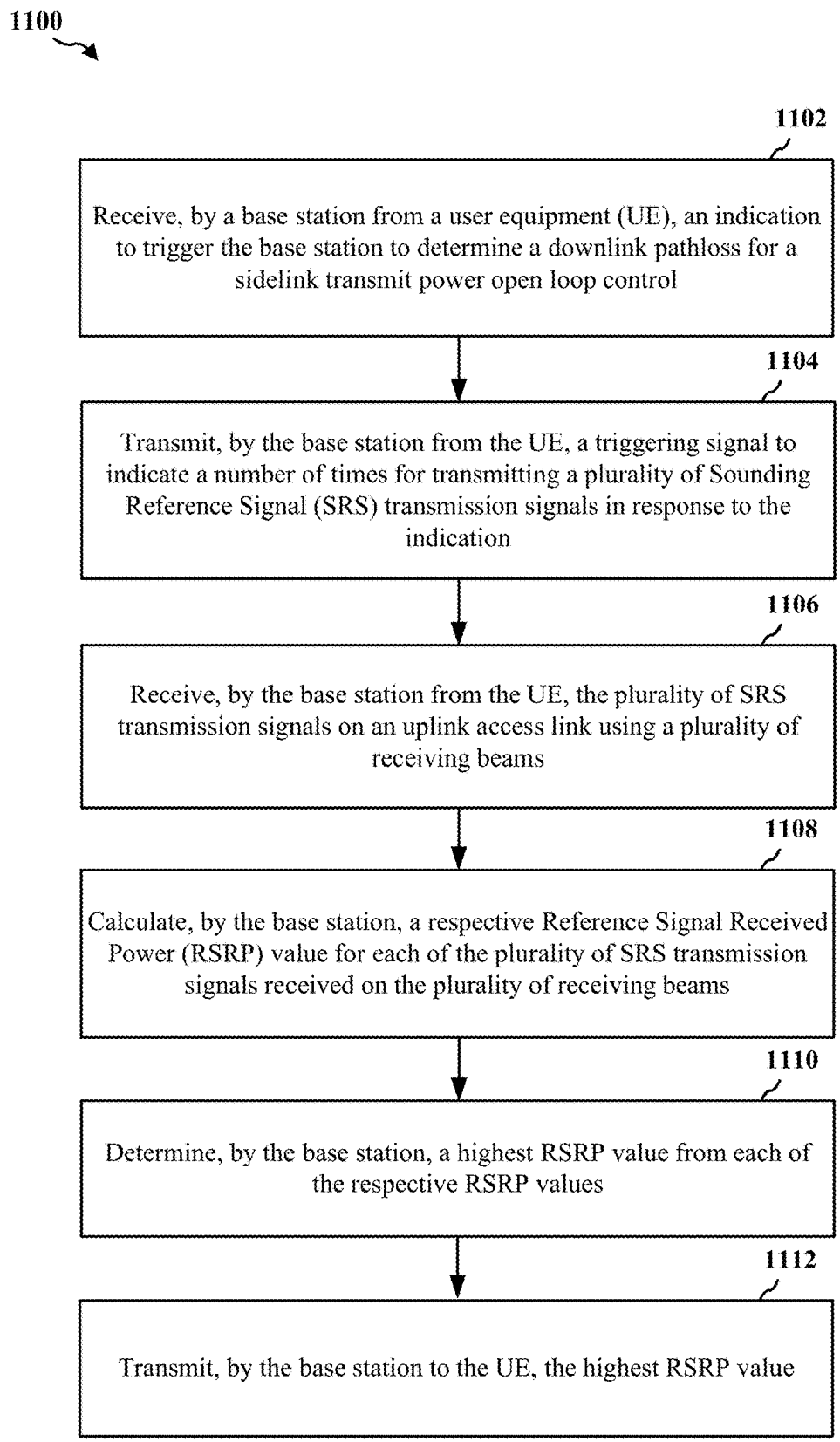
FIG. 11 is a flowchart of a method of wireless communication of a base station using a non-reciprocal procedure for calculating downlink pathloss in accordance with one or more aspects of the present disclosure.

Referring to FIG. 11, an example method 1100 of wireless communication may be performed by the base station 102. In an example, a base station 102 can perform the functions described in method 1100 using one or more of the components described in FIGS. 1, 4 and 13.

At 1102, method 1100 includes receiving, by a base station from a UE, an indication to trigger the base station to receive plurality of SRS transmission from UE on plurality of base station's receive beams to determine a highest RSRP value for a sidelink transmit power open loop control for the UE. In some aspects, the configuration component 199, such as in conjunction with processor(s) 475/1312, memory 476/1316, or transceiver 470/1302, may be configured to receiving, by a base station from a UE, an indication to trigger the base station to receive plurality of SRS transmission from UE on plurality of base station's receive beams to determine a highest RSRP value for a sidelink transmit power open loop control for the UE. Thus, the base station 102, the processor(s) 475/1312, the configuration component 199 may define the means for receiving, by a base station from a UE, an indication to trigger the base station to receive plurality of SRS transmission from UE on plurality of base station's receive beams to determine a highest RSRP value for a sidelink transmit power open loop control for the UE.

At 1104, method 1100 includes transmitting, by the base station to the UE, a triggering signal to indicate a number of times for transmitting a plurality of SRS transmission signals in response to the indication. The number of times for transmitting a plurality of SRS corresponding to the number of receive beams the base station will receive and measure the receive signal power of the plurality of SRS transmissions. In some aspects, the configuration component 199, such as in conjunction with processor(s) 475/1312, memory 476/1316, or transceiver 470/1302, may be configured to transmit, to the UE, a triggering signal to indicate a number of times for transmitting a plurality of SRS transmission signals in response to the indication. The number of times for transmitting a plurality of SRS corresponding to the number of receive beams the base station will receive and measure the receive signal power of the plurality of SRS transmissions. Thus, the base station 102, the processor(s) 475/1312, the configuration component 199 may define the means for transmitting, by the base station to the UE, a triggering signal to indicate a number of times for transmitting a plurality of SRS transmission signals in response to the indication. The number of times for transmitting a plurality of SRS corresponding to the number of receive beams the base station will receive and measure the receive signal power of the plurality of SRS transmissions.

At 1106, method 1100 includes receiving, by the base station from the UE, the plurality of SRS transmission signals on an uplink access link using a plurality of receiving beams. In some aspects, the configuration component 199, such as in conjunction with processor(s) 475/1312, memory 476/1316, or transceiver 470/1302, may be configured to receive, from the UE, the plurality of SRS transmission signals on an uplink access link using a plurality of receiving beams. Thus, the base station 102, the processor(s) 475/1312, the configuration component 199 may define the means for receiving, by the base station from the UE, the plurality of SRS transmission signals on an uplink access link using a plurality of receiving beams.

At 1108, method 1100 includes calculating, by the base station, a respective RSRP value for each of the plurality of SRS transmission signals received on the plurality of receiving beams. In some aspects, the configuration component 199, such as in conjunction with processor(s) 475/1312, memory 476/1316, or transceiver 470/1302, may be configured to calculate a respective RSRP value for each of the plurality of SRS transmission signals received on the plurality of receiving beams. Thus, the base station 102, the processor(s) 475/1312, the configuration component 199 may define the means for calculating, by the base station, a respective RSRP value for each of the plurality of SRS transmission signals received on the plurality of receiving beams.

At 1110, method 1100 includes determining, by the base station, the highest RSRP value from each of the respective RSRP values. In some aspects, the configuration component 199, such as in conjunction with processor(s) 475/1312, memory 476/1316, or transceiver 470/1302, may be configured to determine the highest RSRP value from each of the respective RSRP values. Thus, the base station 102, the processor(s) 475/1312, the configuration component 199 may define the means for determining, by the base station, the highest RSRP value from each of the respective RSRP values.

At 1112, method 1100 includes transmitting, by the base station to the UE, the highest RSRP value. In some aspects, the configuration component 199, such as in conjunction with processor(s) 475/1312, memory 476/1316, or transceiver 470/1302, may be configured to transmit, to the UE, the highest RSRP value. Thus, the base station 102, the processor(s) 475/1312, the configuration component 199 may define the means for transmitting, by the base station to the UE, the highest RSRP value.

Figure 12:
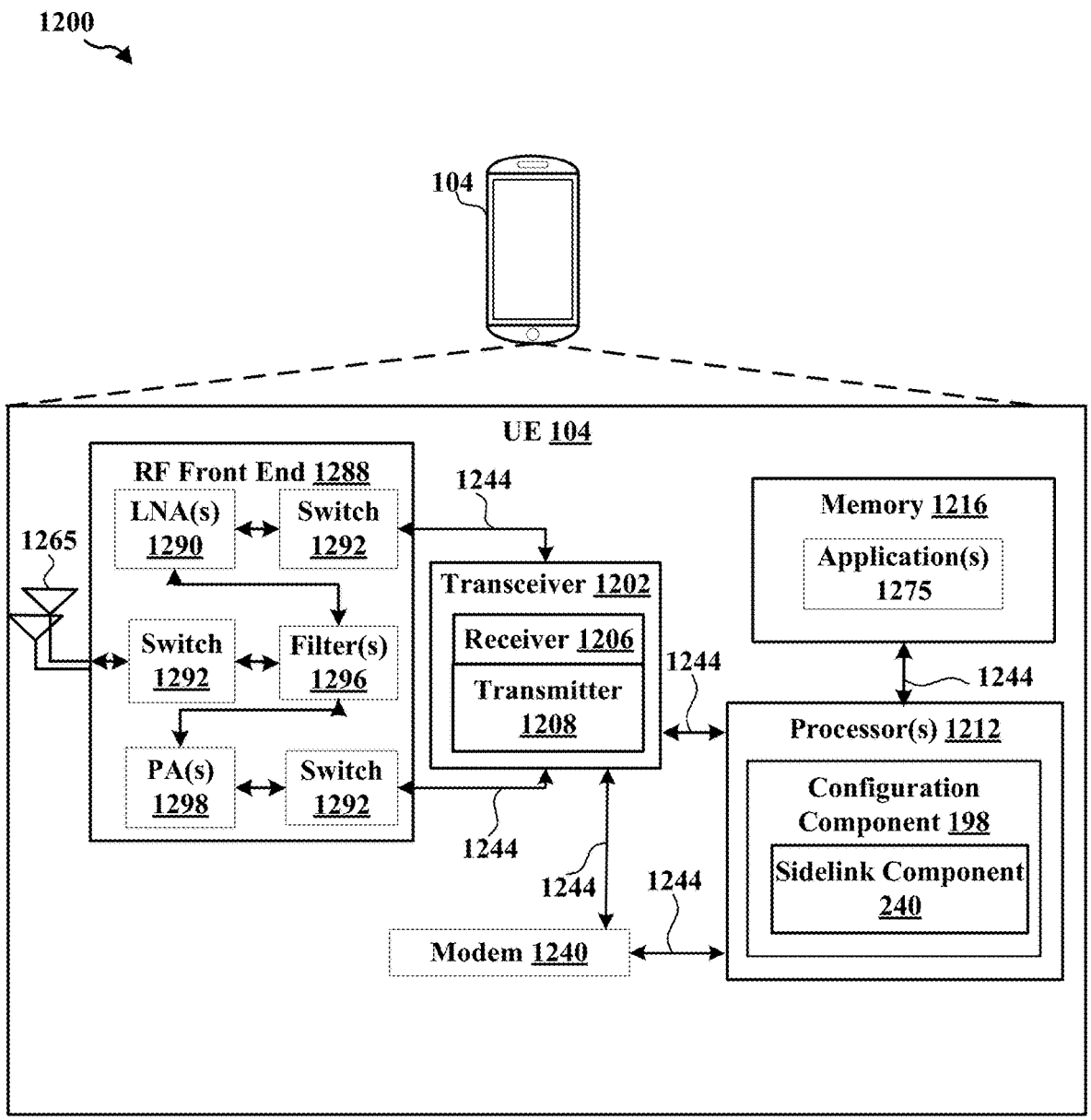
FIG. 12 is a block diagram illustrating an example of a UE, in accordance with one or more aspects of the present disclosure.

Referring to FIG. 12, one example of an implementation of UE 104 may include a variety of components, some of which have already been described above and are described further herein, including components such as one or more processors 1212 and memory 1216 and transceiver 1202 in communication via one or more buses 1244, which may operate in conjunction with modem 1240 and/or configuration component 198 for communicating sidelink capability information.

In an aspect, the one or more processors 1212 can include a modem 1240 and/or can be part of the modem 1240 that uses one or more modem processors. Thus, the various functions related to configuration component 198 may be included in modem 1240 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1240 associated with configuration component 198 may be performed by transceiver 1202.

Also, memory 1216 may be configured to store data used herein and/or local versions of applications 1275 or communicating component 1242 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining configuration component 198 and/or one or more of its subcomponents, and/or data associated therewith, when UE 104a is operating at least one processor 1212 to execute configuration component 198 and/or one or more of its subcomponents.

Transceiver 1202 may include at least one receiver 1206 and at least one transmitter 1208. Receiver 1206 may include hardware and/or software executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102. Additionally, receiver 1206 may process such received signals, and also may obtain measurements of the signals, such as, but not limited to, Ec/Io, signal-to-noise ratio (SNR), reference signal received power (RSRP), received signal strength indicator (RSSI), etc. Transmitter 1208 may include hardware and/or software executable by a processor for transmitting data, the code comprising instructions and being stored in a memory (e.g., computer-readable medium). A suitable example of transmitter 1208 may including, but is not limited to, an RF transmitter.

Moreover, in an aspect, UE 104 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 104 can communicate with, for example, one or more base stations 102 or one or more cells associated with one or more base stations 102. In an aspect, for example, modem 1240 can configure transceiver 1202 to operate at a specified frequency and power level based on the UE configuration of the UE 104a and the communication protocol used by modem 1240.

In an aspect, modem 1240 can be a multiband-multimode modem, which can process digital data and communicate with transceiver 1202 such that the digital data is sent and received using transceiver 1202. In an aspect, modem 1240 can be multiband and be configured to support multiple frequency bands for a specific communications protocol. In an aspect, modem 1240 can be multimode and be configured to support multiple operating networks and communications protocols. In an aspect, modem 1240 can control one or more components of UE 104a (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104*a* as provided by the network during cell selection and/or cell reselection.

In an aspect, communicating component 1242 can optionally include mode determining component 1252. For example, upon receiving an anchor signal in an initial bandwidth portion from a network entity 102, the anchor signal triggering an initial access procedure for the UE 104*a*, mode determining component 1252 may determine whether to operate in a wideband OFDM mode or a wideband SC-FDM mode in response to receiving the anchor signal. Communicating component 1242 may then transmit a capability report message to the network entity 102 based on the determination by the mode determining component 1252 of whether to operate in the wideband OFDM mode or the wideband SC-FDM mode In an aspect, the processor(s) 1212 may correspond to one or more of the processors described in connection with the UE in FIG. 4. Similarly, the memory 1216 may correspond to the memory described in connection with the UE in FIG. 4.

Figure 13:
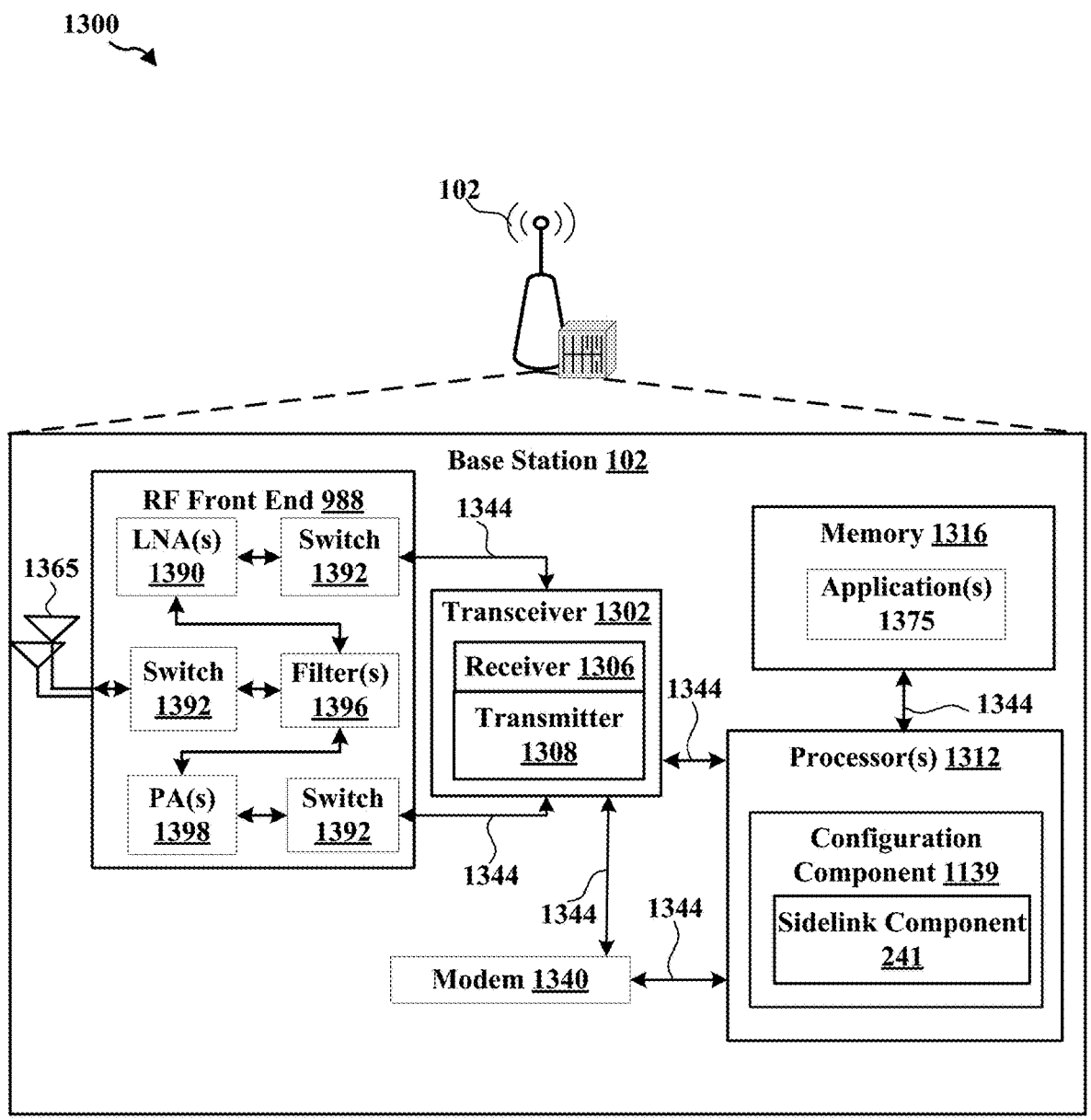
FIG. 13 is a block diagram illustrating an example of a base station, in accordance with one or more aspects of the present disclosure.

Referring to FIG. 13, one example of an implementation of base station 132 (e.g., a base station 132, as described above) may include a variety of components, some of which have already been described above, but including components such as one or more processors 1312 and memory 1316 and transceiver 1302 in communication via one or more buses 1344, which may operate in conjunction with modem 1340 and configuration component 199 for communicating sidelink capability information.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 134, as described above, but configured or otherwise programmed for base station operations as opposed to UE operations.

In an aspect, the processor(s) 1312 may correspond to one or more of the processors described in connection with the base station in FIG. 4. Similarly, the memory 1316 may correspond to the memory described in connection with the base station in FIG. 4.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communications at a user equipment (UE), comprising:
  receiving, by the UE and in a direction of a sidelink transmission beam, a plurality of synchronization reference signals from a base station, wherein the sidelink transmission beam is configured at the UE for transmitting sidelink communications to a second UE;
  measuring a respective Reference Signal Received Power (RSRP) value of each of the plurality of synchronization reference signals;
  determining a highest RSRP value from each of the respective RSRP values;
  calculating a downlink pathloss associated with a sidelink open loop power control based on the highest RSRP value; and
  determining a transmit power of communication with the second UE on a sidelink based on a minimum between a sum of a desired received signal power at the second UE and the downlink pathloss and a sum of the desired received signal power at the second UE and a pathloss between the UE and the second UE.

2. The method of claim 1, wherein the plurality of synchronization reference signals correspond to a plurality of Synchronization Signal Block (SSB) transmission signals.

3. The method of claim 2, wherein calculating the downlink pathloss further comprises calculating the downlink pathloss based on a difference between a transmit power value of the plurality of SSB transmission signals and the highest RSRP value.

4. The method of claim 1, wherein receiving the plurality of synchronization reference signals further comprises receiving the plurality of synchronization reference signals on a receiving beam.

5. The method of claim 4, wherein the receiving beam is used for communicating with the second UE on a sidelink.

6. The method of claim 1, further comprising determining, by the UE, a transmit power of communications with the second UE on a sidelink based on the downlink pathloss.

7. The method of claim 6, wherein determining the transmit power of communication with the second UE on the sidelink further comprises calculating a sidelink transmit power based on a target receive power value and the downlink pathloss.

8. The method of claim 7, wherein the target receive power value corresponds to an open loop power control for the sidelink transmit power.

9. The method of claim 6, further comprising transmitting, by the UE to the second UE via the sidelink, a sidelink transmission based on the transmit power.

10. The method of claim 9, wherein the transmit power compensates for the downlink pathloss and limit interference caused by the sidelink transmission to a network entity.

11. The method of claim 1, wherein the pathloss between the UE and the second UE is calculated based on a RSRP with a transmit power by the second UE.

12. An apparatus for communication at a user equipment (UE), comprising:
a memory configured to store instructions; and
one or more processors communicatively coupled with the memory, wherein the one or more processors are configured to execute the instructions to:
receive, in a direction of a sidelink transmission beam, a plurality of synchronization reference signals from a base station, wherein the sidelink transmission beam is configured at the UE for transmitting sidelink communications to a second UE;
measure a respective Reference Signal Received Power (RSRP) value of each of the plurality synchronization reference signals;
determine a highest RSRP value from each of the respective RSRP values;
calculate a downlink pathloss associated with a sidelink open loop power control based on the highest RSRP value; and
determining a transmit power of communications with the second UE on a sidelink based on a minimum between a sum of a desired received signal power at the second UE and the downlink pathloss and a sum of the desired received signal power at the second UE and a pathloss between the UE and the second UE.

13. The apparatus of claim 12, wherein the plurality of synchronization reference signals correspond to a plurality of Synchronization Signal Block (SSB) transmission signals.

14. The apparatus of claim 13, wherein the one or more processors configured to calculate the downlink pathloss are further configured to calculate the downlink pathloss based on a difference between a transmit power value of the plurality of SSB transmission signals and the highest RSRP value.

15. The apparatus of claim 12, wherein the one or more processors configured to receive the plurality of synchronization reference signals are further configured to receive the plurality of synchronization reference signals on a receiving beam.

16. The apparatus of claim 15, wherein the receiving beam is used for communicating with the second UE on a sidelink.

17. The apparatus of claim 12, wherein the one or more processors are configured to determine, by the UE, a transmit power of communications with the second UE on the sidelink based on the downlink pathloss.

18. The apparatus of claim 17, the one or more processors configured to determine the transmit power of communication with the second UE on the sidelink are further configured to calculate a sidelink transmit power based on a target receive power value and the downlink pathloss.

19. The apparatus of claim 18, wherein the target receive power value corresponds to an open loop power control for the sidelink transmit power.

20. The apparatus of claim 17, wherein the one or more processors are configured to transmit, by the UE to the second UE via the sidelink, a sidelink transmission based on the transmit power.

21. The apparatus of claim 20, wherein the transmit power compensates for the downlink pathloss and limit interference caused by the sidelink transmission to a network entity.

* * * * *